(12) United States Patent
Gipalo

(10) Patent No.: US 6,348,934 B1
(45) Date of Patent: *Feb. 19, 2002

(54) METHOD FOR ENABLING RAPID MODIFICATION OF A DISPLAY CONTROLLED BY A COMPUTER PROGRAM

(75) Inventor: Dave Gipalo, Jacksonville, FL (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/572,056

(22) Filed: May 17, 2000

Related U.S. Application Data

(63) Continuation of application No. 08/991,570, filed on Dec. 16, 1997, now Pat. No. 6,088,028.

(51) Int. Cl.[7] ................................................ G06F 3/00
(52) U.S. Cl. ....................... 345/762; 345/744; 345/763; 345/764
(58) Field of Search ................................. 345/333, 334, 345/335, 339, 762, 744, 763, 764; 395/682; 705/38, 302; 709/302, 328

(56) References Cited

U.S. PATENT DOCUMENTS

| | | | | |
|---|---|---|---|---|
| 5,327,529 A | * | 7/1994 | Fults et al. | 345/335 |
| 5,438,659 A | * | 8/1995 | Notess et al. | 345/335 |
| 5,550,971 A | * | 8/1996 | Brunner et al. | 707/3 |
| 5,555,365 A | * | 9/1996 | Selby et al. | 345/335 |
| 5,680,618 A | * | 10/1997 | Freund | 707/7 |
| 5,818,446 A | * | 10/1998 | Bertram et al. | 345/334 |

* cited by examiner

*Primary Examiner*—Raymond J. Bayerl
*Assistant Examiner*—Cuong T. Thai

(57) ABSTRACT

A credit card processing system includes a layer of abstraction between the presentation layer and the display, which enables rapid modification of the display by a user who is not necessarily knowledgeable about the inner workings of the presentation layer. To enable rapid modification of the program that controls a graphical user interface, the present invention uses generic statements in the commands in the underlying computer program that reference a series of tables (termed "Meta Data Tables"), in which are stored the values necessary to effect the desired command. These tables are known as Meta Data Tables because they store Meta Data, which is defined as data or information about other data. A powerful example of the use of the Meta Data Table is to define the nodes within the tree of screens presented to the user in a Graphical User Interface (GUI). By defining the nodes in the tree in a Meta Data Table, these nodes can be changed easily, but even more significant, the underlying code can be significantly reduced in size.

30 Claims, 15 Drawing Sheets

FIG. 3

PRODUCTION SUPPORT

32 — 33 — CHOOSE AN APPLICATION TO OPEN   34   35

36  OK  CANCEL

| APPLICATION ID | APPLICANT NAME | APPLICATION TYPE | RESPONSE DATE |
|---|---|---|---|
| 199709040404180 | WILLIAM F*BEAUDIN | SSOL = solicited | 1997-05-29-00:00:00 |
| 199709040404210 | STEVE*PAWLIK | SSOL = solicited | 1997-05-29-00:00:00 |
| 199709040404212 | WILLIAM F*BEAUDIN | SSOL = solicited | 1997-05-29-00:00:00 |
| 199709040404097 | MARILYN J*SMITH | SSOL = solicited | 1997-05-30-00:00:00 |
| 199709040404132 | * | SSOL = solicited | 1997-05-30-00:00:00 |
| 199709040404133 | JAMES F*STEIGER | SSOL = solicited | 1997-05-30-00:00:00 |
| 199709040404147 | LOGAN H*ROOTS | SSOL = solicited | 1997-05-30-00:00:00 |
| 199709040404148 | JAMES B*HARBOUR | SSOL = solicited | 1997-05-30-00:00:00 |
| 199709040404149 | DAVID M*ZAKUTNEY | SSOL = solicited | 1997-05-30-00:00:00 |
| 199709040404151 | LAURA J*HODGINS | SSOL = solicited | 1997-05-30-00:00:00 |
| 199709040404153 | *NORMA | SSOL = solicited | 1997-05-30-00:00:00 |
| 199709040404154 | *KING | SSOL = solicited | 1997-05-30-00:00:00 |
| 199709040404161 | ANTHONY*MARESCA | SSOL = solicited | 1997-05-30-00:00:00 |
| 199709040404162 | GARY S*WEISS | SSOL = solicited | 1997-05-30-00:00:00 |

45a 1997090404180 WILLIAM F BEAUDIN SSOL PENDING MANUAL REVIEW

45b Decision | Application | Credit — 45c

□ Solicited (SSOL) Application
  ✓ Applicant — 42
  ✓ Co-Applicant
  ✗ Authorized Users — 41
  ✓ Addresses/Phone #'s
  ✓ Employment
  ✗ Balance Transfer
  ✓ Miscellaneous
  ✗ Requested Products
  ✓ Assigned Products
  ✗ Override Products
  ✗ Scoring Summary

46

| 1 Summary | 2 Products | 3 Memos | Addresses / Phone #'s — 47 | 4 Letters | 5 Explore — 43 |

44  40

46

| Field | Value |
|---|---|
| Home Addr Parse Type Code | ST = Street Address |
| Home Addr Street Number | 25 |
| Home Addr Leading Street Dir | |
| Home Addr Street Name | COLUMBIA |
| Home Addr Street Type | ST = Street |
| Home Addr Trailing Street Dir | |
| Home Addr Apt Designator Cd | |
| Home Addr Apt Number | |
| Home Addr PO Box Code | |
| Home Addr Route Code | |
| Home Addr RR Box Number | |
| Home Addr APO/FPO Code | |
| Home Addr Unparsed Line 1 | 25 COLUMBIA ST |
| Home Addr Unparsed Line 2 | |
| Home Addr City | WILMINGTON |
| Home Addr State | MA = Massachusetts |
| Home Addr Zip Code | 01887000000 |
| Home Phone Area Code | 508 |

Save | Solicitation | Run DP | Use CBR | View | Next | Search | Cancel

Edit

18000_ProductionSupport

FIG. 5A

| | APP_TYP_CD | ND_ID | FRM_ID | TREE_TYP_CD | DSPLY_ORDR_NUM |
|---|---|---|---|---|---|
| 75 | UCAR | APPENTRY | DFLT | 0 | 10 |
| | SSOL | SSOL | SSOL | 0 | 20 |
| 72 | SSOL | APPLICATIO | MAINT | 1 | 100 |
| | SSOL | APPLICANT | MAINT | 1 | 110 |
| | SSOL | COAPP | MAINT | 1 | 120 |
| | SSOL | AUTHUSER | MAINT | 1 | 130 |
| | SSOL | ADDR | MAINT | 1 | 140 |
| | SSOL | VIEWADDR | MAINT | 1 | 145 |
| | SSOL | EMPLOYMENT | MAINT | 1 | 180 |
| | SSOL | BT | MAINT | 1 | 200 |
| | SSOL | MISC | MAINT | 1 | 220 |
| | SSOL | REQPROD | MAINT | 1 | 230 |
| | SSOL | APPPROD | MAINT | 1 | 240 |
| | SSOL | OVRPROD | MAINT | 1 | 250 |
| | SSOL | SCORESUM | MAINT | 1 | 260 |
| | SSOL | ALERTMATCH | MAINT | 1 | 300 |
| | SSOL | ALERTSSN | MAINT | 1 | 310 |
| | SSOL | ALERTADDR | MAINT | 1 | 330 |
| | SSOL | ALERTPHONE | MAINT | 1 | 340 |
| | SSOL | CARDMATCH | MAINT | 1 | 350 |
| | SSOL | CARDSSN | MAINT | 1 | 360 |
| | SSOL | CARDNAME | MAINT | 1 | 370 |
| | SSOL | CARDADDR | MAINT | 1 | 380 |
| | SSOL | CARDPHONE | MAINT | 1 | 390 |
| | SSOL | APPMATCH | MAINT | 1 | 400 |
| | SSOL | APPSSN | MAINT | 1 | 410 |
| | SSOL | APPNAME | MAINT | 1 | 420 |
| | SSOL | APPADDR | MAINT | 1 | 430 |
| | SSOL | APPPHONE | MAINT | 1 | 440 |
| | SSOL | SOLMATCH | MAINT | 1 | 450 |
| | SSOL | SOLPROSPECT | MAINT | 1 | 460 |
| | SSOL | SOLADDRP | MAINT | 1 | 470 |
| | SSOL | SOLADDRU | MAINT | 1 | 475 |
| | SSOL | SOLMISC | MAINT | 1 | 480 |
| | SSOL | SOLATTINFO | MAINT | 1 | 485 |
| 73 | CRDT | PERSON | CREDIT | P | 1000 |
| | CRDT | PERSON | CREDIT | P | 1010 |
| | CRDT | PERSON | CREDIT | P | 1030 |
| 74 | CRDT | CRDDET | CREDIT | D | 2000 |
| | CRDT | CRNAME | CREDIT | D | 2010 |
| | CRDT | CRADDRESS | CREDIT | D | 2020 |
| | CRDT | CBREMPL | CREDIT | D | 2030 |
| | CRDT | CBRSCORES | CREDIT | D | 2040 |
| | CRDT | CRTRADE | CREDIT | D | 2050 |
| | CRDT | CRINQUIRY | CREDIT | D | 2060 |
| | CRDT | CRPUBREC | CREDIT | D | 2070 |
| | CRDT | CBRCOLLECTI | CREDIT | D | 2080 |

FIG. 5B

| DTRMNT_ENTY_NM | DTRMNT_FLD_NM | CNDTN_CD | INSTNC_VAL_DSC |
|---|---|---|---|
| PERSON | APPLCNT_TYP_CD | = | 0 |
| PERSON | APPLCNT_TYP_CD | = | 1 |
| PERSON | APPLCNT_TYP_CD | = | B |
| CRDDET | | | |
| CRDDET | | | |
| CRDDET | | | |
| CRDDET | | | |
| CRDDET | | | |
| CRDDET | | | |
| CRDDET | | | |
| CRDDET | | | |
| CRDDET | | | |

FIG. 5C

| CHK_CALC_NM | ND_DSC | FRM_DSC |
|---|---|---|
| | Application Entry | Application Entry-All UCAR Fields |
| | Solicited Apps | Application Entry SSOL |
| | Solicited (SSOL) Application | Maintenance for SSOL-All Fields |
| cPersonTypeCount(0) | Applicant | Maintenance for SSOL-Applicant |
| cPersonTypeCount(1) | Co-Applicant | Maintenance for SSOL-Co-App |
| cPersonTypeCount(2) | Authorized Users | Maintenance for SSOL-Auth Users |
| cAddressTypeCount(%) | Addresses/Phone #s | Maintenance for SSOL-Unparsed Address |
| cAddressTypeCount(%) | View Addresses/Phone #s | Maintenance for SSOL-Unparsed Address |
| cEmploymentInfoSum | Employment | Maintenance for SSOL-Unparsed Employment |
| cBalXferInfoSum | Balance Transfer | Maintenance for SSOL-Unparsed BT |
| cPersonTypeCount(0) | Miscellaneous | Maintenance for SSOL-Misc Data |
| cPersonTypeCount(0) | Requested Products | Maintenance for SSOL-Requested Products |
| cAsgndSeqNumPpld | Assigned Products | Maintenance for SSOL-Assigned Products |
| cOvrdRsnCd | Override Products | Maintenance for SSOL-Override Products |
| cCntCrdtRpts | Scoring Summary | Maintenance for SSOL-Scoring Summary |
| | Alert File Hits | Alert File-Match |
| | }cFileMatchSSNString(ALER | Alert File Match-SSN hits |
| | }cFileMatchAddressString(AL | Alert File Match-Address hits |
| | }cFileMatchPhoneString(ALE | Alert File Match-Phone hits |
| | Cardmember File Hits | Cardcat File-Match |
| | }cFileMatchSSNString(CARD | Cardcat File Match-SSN hits |
| | }cFileMatchNameString(CAR | Cardcat File Match-Name hits |
| | }cFileMatchAddressString(C | Cardcat File Match-Address hits |
| | }cFileMatchPhoneString(CAR | Cardcat File Match-Phone hits |
| | App File Hits | Application File Match |
| | }cFileMatchSSNString(APPLI | App File Match-SSN hits |
| | }cFileMatchNameString(APP | App File Match-Name hits |
| | }cFileMatchAddressString(A | App File Match-Address hits |
| | }cFileMatchPhoneString(APP | App File Match-Phone hits |
| | Solicitation File | Solicitation File Match |
| | Prospect Name/SNN | Solicitation File Match-Prospect |
| | Prospect Address-Parsed | Solicitation File Match-Address |
| | Prospect Address-Unparsed | Solicitation File Match-Address |
| | Prospect Offer/Scores | Solicitation File Match-Misc |
| | Prospect AT&T Info | Solicitation File Match-Misc |
| | Applicant | Applicant Node for Credit Bureau |
| | Co-Applicant | Co-Applicant Node for Credit Bureau |
| | Other | Other Person Node for Credit Bureau |
| cPerson_CR_CRD_IsAct | }cCrdDet_Header_For_GUI | Name of Credit Bureau |
| | Name/SSN/YOB | CBR Name Info |
| | Addresses | CBR Address Info |
| | Employment | CBR Employment Info |
| | Scores/Reasons | CBR Scores Info |
| | Trades | CBR Trades Info |
| | Inquiries | CBR Inquiries Info |
| | PR/Judgements/Liens | CBR Public Records Info |
| | Collections | CBR Collections Info |

FIG. 5D

| PRNT_ND_ID | EXPND_ND_IND | CNT_CALC_NM | DSPLY_FMT_CD | ND_TYP_CD |
|---|---|---|---|---|
|  | Y |  | DV | F |
| APPENTRY | N |  | DV | F |
|  | Y |  | DV | X |
| APPLICATIO | N |  | DV | F |
| APPLICATIO | N |  | DV | F |
| APPLICATIO | N |  | DV | F |
| APPLICATIO | N |  | DV | F |
| ADDR | N |  | DV | F |
| APPLICATIO | N |  | DV | F |
| APPLICATIO | N |  | DV | F |
| APPLICATIO | N |  | DV | F |
| APPLICATIO | N |  | DV | F |
| APPLICATIO | N |  | DV | F |
| APPLICATIO | N |  | DV | F |
| APPLICATIO | N |  | DV | F |
|  | N | cFileMatchTypeC | ND | X |
| ALERTMATCH | N | cFileMatchTypeC | ND | X |
| ALERTMATCH | N | cFileMatchTypeC | ND | X |
| ALERTMATCH | N | cFileMatchTypeC | ND | X |
|  | N | cFileMatchTypeC | ND | X |
| CARDMATCH | N | cFileMatchTypeC | ND | X |
| CARDMATCH | N | cFileMatchTypeC | ND | X |
| CARDMATCH | N | cFileMatchTypeC | ND | X |
| CARDMATCH | N | cFileMatchTypeC | ND | X |
|  | N | cFileMatchTypeC | ND | X |
| APPMATCH | N | cFileMatchTypeC | ND | X |
| APPMATCH | N | cFileMatchTypeC | ND | X |
| APPMATCH | N | cFileMatchTypeC | ND | X |
| APPMATCH | N | cFileMatchTypeC | ND | X |
|  | N | cFileMatchTypeC | ND | X |
| SOLMATCH | N | cFileMatchTypeC | ND | F |
| SOLMATCH | N | cFileMatchTypeC | ND | F |
| SOLADDRP | N | cFileMatchTypeC | ND | F |
| SOLMATCH | N | cFileMatchTypeC | ND | F |
| SOLMATCH | N | cFileMatchTypeC | ND | F |
|  | Y | cPerson_CrdRpt_ | ND | F |
|  | Y | cPerson_CrdRpt_ | ND | F |
|  | Y | cPerson_CrdRpt_ | ND | F |
| PERSON | Y | cCrdRpt_CRDet_ | DV | C |
| CRDDET | N | cCRDet_CRNam | ND | M |
| CRDDET | N | cCRDet_CRAddr | ND | F |
| CRDDET | N | cCRDet_Nbr_of_ | ND | F |
| CRDDET | N | cCRDet_CRMisc | ND | F |
| CRDDET | N | cCRDet_CRTrad | ND | M |
| CRDDET | N | cCRDet_CRInq | ND | M |
| CRDDET | N | cCRDet_CRPub | ND | M |
| CRDDET | N | cCRDet_Nbr_of_ | ND | M |

FIG. 5E

| SPLTR_POS_NUM | DRGBL_IND | MNL_SEL_IND |
|---|---|---|
| 0 | N | |
| 0 | Y | |
| 0 | N | |
| 0 | Y | |
| 0 | Y | |
| 0 | Y | |
| 0 | Y | |
| 0 | Y | |
| 0 | Y | |
| 0 | Y | |
| 0 | Y | |
| 0 | Y | |
| 0 | Y | |
| 0 | Y | |
| 0 | Y | |
| 0 | Y | |
| 0 | N | |
| 0 | N | |
| 0 | N | |
| 0 | N | |
| 0 | N | |
| 0 | N | |
| 0 | N | |
| 0 | N | |
| 0 | N | |
| 0 | N | |
| 0 | N | |
| 0 | N | |
| 0 | N | |
| 0 | N | |
| 0 | N | |
| 0 | Y | |
| 0 | Y | |
| 0 | Y | |
| 0 | Y | |
| 0 | Y | |
| 0 | N | Y |
| 0 | N | N |
| 0 | Y | N |
| 0 | N | |
| 0 | Y | |
| 0 | Y | |
| 0 | Y | |
| 0 | Y | |
| 1 | Y | |
| 1 | Y | |
| 1 | Y | |
| 1 | Y | |

FIG. 6A
60

| APP_TYP_CD | ND_ID | DSPLY | PARENT_ENTY_NM | PARENT_DTRMNT_FLD_NM |
|---|---|---|---|---|
| SSOL | ADDR | 10 | PERSON | APPLCNT_TYP_CD |
| SSOL | ADDR | 20 | PERSON | APPLCNT_TYP_CD |
| SSOL | ADDR | 30 | PERSON | APPLCNT_TYP_CD |
| SSOL | ADDR | 40 | PERSON | APPLCNT_TYP_CD |
| SSOL | ADDR | 50 | PERSON | APPLCNT_TYP_CD |
| SSOL | ADDR | 60 | PERSON | APPLCNT_TYP_CD |
| SSOL | ADDR | 70 | PERSON | APPLCNT_TYP_CD |
| SSOL | ADDR | 80 | PERSON | APPLCNT_TYP_CD |
| SSOL | ADDR | 90 | PERSON | APPLCNT_TYP_CD |
| SSOL | ADDR | 100 | PERSON | APPLCNT_TYP_CD |
| SSOL | ADDR | 110 | PERSON | APPLCNT_TYP_CD |
| SSOL | ADDR | 120 | PERSON | APPLCNT_TYP_CD |
| SSOL | ADDR | 130 | PERSON | APPLCNT_TYP_CD |
| SSOL | ADDR | 140 | PERSON | APPLCNT_TYP_CD |
| SSOL | ADDR | 150 | PERSON | APPLCNT_TYP_CD |
| SSOL | ADDR | 160 | PERSON | APPLCNT_TYP_CD |
| SSOL | ADDR | 170 | PERSON | APPLCNT_TYP_CD |
| SSOL | ADDR | 180 | PERSON | APPLCNT_TYP_CD |
| SSOL | ADDR | 190 | PERSON | APPLCNT_TYP_CD |
| SSOL | ADDR | 200 | PERSON | APPLCNT_TYP_CD |
| SSOL | ADDR | 210 | PERSON | APPLCNT_TYP_CD |
| SSOL | ADDR | 220 | PERSON | APPLCNT_TYP_CD |
| SSOL | ADDR | 230 | PERSON | APPLCNT_TYP_CD |
| SSOL | ADDR | 240 | APP | |

Columns: 64a, 64b, 64c, 64d, 64e

FIG. 6B
60

| PARENT_CNDTN_CD | PARENT_INSTNC_VAL_DSC | ENTY_NM |
|---|---|---|
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | ADDRESS |
| = | 0 | PHONE |
| = | 0 | PHONE |
| = | 0 | PHONE |
| = | 0 | ADDRESS |
| = | 0 | ADDRESS |
| = | 0 | ADDRESS |
|   |   | PERSON |

Columns: 65a, 65b, 65c

FIG. 6C
60

| COLUMN_NAME | DTRMNT_FLD_NM | CNDTN_CD | INSTNC_VAL_DSC |
|---|---|---|---|
| ADDR_PRS_TYP_CD | ADDR_TYP_CD | = | HO |
| STRT_NO | ADDR_TYP_CD | = | HO |
| STRT_DIR_PRE_CD | ADDR_TYP_CD | = | HO |
| STREET_NM | ADDR_TYP_CD | = | HO |
| STREET_TYP_CD | ADDR_TYP_CD | = | HO |
| STRT_DIR_POST_CD | ADDR_TYP_CD | = | HO |
| APT_NO_DESIG_CD | ADDR_TYP_CD | = | HO |
| APT_NO_CD | ADDR_TYP_CD | = | HO |
| PO_BOX_CD | ADDR_TYP_CD | = | HO |
| ROUTE_CD | ADDR_TYP_CD | = | HO |
| RR_BOX_NO | ADDR_TYP_CD | = | HO |
| APO_FPO_CD | ADDR_TYP_CD | = | HO |
| ADDR_LINE1 | ADDR_TYP_CD | = | HO |
| ADDR_LINE2 | ADDR_TYP_CD | = | HO |
| CITY_NM | ADDR_TYP_CD | = | HO |
| STATE_CD | ADDR_TYP_CD | = | HO |
| ZIP_CD | ADDR_TYP_CD | = | HO |
| NPA_CD | TN_ROLE_CD | = | HO |
| NXX_CD | TN_ROLE_CD | = | HO |
| LINE_NUM | TN_ROLE_CD | = | HO |
| ENT_ADDR_YR | ADDR_TYP_CD | = | HO |
| ENT_ADDR_MO | ADDR_TYP_CD | = | HO |
| USAGETYPECD | ADDR_TYP_CD | = | HO |
| EMAIL_ADDR_NM | APPLCNT_TYP_CD | = | 0 |

| INSTNC_NUM | UPDT_ | CRTCL_FLD_IND | DSPLY_EDT_CD | DSPLY_LBL_NM | |
|---|---|---|---|---|---|
| | Y | Y | | Home Addr Parse Type Code | — 62 |
| | Y | Y | | Home Addr Street Number | |
| | Y | Y | | Home Addr Leading Street Dir | |
| | Y | Y | | Home Addr Street Name | |
| | Y | Y | | Home Addr Street Type | |
| | Y | Y | | Home Addr Trailing Street Dir | |
| | Y | Y | | Home Addr Apt Designator Cd | |
| | Y | Y | | Home Addr Apt Number | |
| | Y | Y | | Home Addr PO Box Code | |
| | Y | Y | | Home Addr Route Code | |
| | Y | Y | | Home Addr RR Box Number | |
| | Y | Y | | Home Addr APO/FPO Code | |
| | Y | Y | | Home Addr Unparsed Line 1 | — 63 |
| | Y | Y | | Home Addr Unparsed Line 2 | |
| | Y | Y | | Home Addr City | |
| | Y | Y | | Home Addr State | |
| | Y | Y | 99999-ZZZZ | Home Addr Zip Code | |
| | Y | Y | | Home Phone Area Code | |
| | Y | Y | | Home Phone Exchange | |
| | Y | Y | | Home Phone Line | |
| | Y | | ZZZZZ | Yrs at Current Residence | |
| | Y | | ZZZZZ | Mos at Current Residence | |
| | Y | | | Residence Status | |
| | Y | | | Email Address | |

Columns: 67a, 67b, 67c, 67d, 67e

| DSPLY_HLP_TXT | COL_SZ_CNT | ENUM_EXISTS_IND | SCRTY_CALC_NM |
|---|---|---|---|
| | 2 | Y | |
| | 10 | N | |
| | 2 | Y | |
| | 33 | N | |
| | 2 | Y | |
| | 2 | Y | |
| | 5 | Y | |
| | 4 | N | |
| | 20 | N | |
| | 12 | N | |
| | 8 | N | |
| | 30 | N | |
| | 40 | N | |
| | 40 | N | |
| | 20 | N | |
| | 2 | Y | |
| | 9 | N | |
| | 3 | N | |
| | 3 | N | |
| | 4 | N | |
| | 2 | N | |
| | 2 | N | |
| | 1 | Y | |
| | 50 | N | |

Column headers: 68a, 68b, 68c, 68d

| DSPLY_CNTRL_TYP_CD (69a) | PARENT_INSTNC_NUM (69b) |
|---|---|
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |
| 0 | |

METHOD FOR ENABLING RAPID MODIFICATION OF A DISPLAY CONTROLLED BY A COMPUTER PROGRAM

CROSS-REFERENCE TO RELATED APPLICATION

The present application is a continuation of U.S. patent application Ser. No. 08/991,570, filed on Dec. 16, 1997, now U.S. Pat. No. 6,088,028.

BACKGROUND OF THE INVENTION

The present invention relates generally to methods for processing information via graphical user interfaces in a client-server environment, and more particularly to a method for processing information via a graphical user interface in a client-server environment, in which data displayed on the client can be rapidly changed to accommodate changing user requirements.

Often, programs to control a Graphical User Interface (GUI) are written in a high level programming language, such as Visual Basic, to create a GUI on which a variety of data is displayed. This software can reside either in the server or the client in a client-server environment. In the case where the software resides in the client, the distribution and version of the software is tightly controlled to prevent proliferation of different versions of the software, and hence the inherent problems associated with maintaining multiple versions of software.

While desirable, the result of this control can lead to significant delays in implementing user requested changes, even if the changes are relatively insignificant. For example, to reorder the appearance of data that is displayed on the user's screen may require several weeks or months, depending upon the available resources and size of the underlying program. Especially in today's environment, programming resources are scarce, and often they are dedicated to bringing new systems online, rather than implementing minor changes to existing systems that are operating satisfactorily. In fact, modifications are not usually made to systems that are operating unless problems are detected, at which time the minor modifications can also be implemented with a new code version. Therefore, users can often be forced to work with a system that operates satisfactorily but is still less than optimum.

The present invention is therefore directed to the problem of developing a method for enabling rapid modification of a graphical user interface in a way that does not require detailed understanding of the underlying program or even technical knowledge so that it can be implemented by a non-software engineer, or a user of the system.

SUMMARY OF THE INVENTION

The present invention solves this problem by providing a layer of abstraction between the presentation layer and the graphical user interface.

For example, in a program written in Visual Basic, the commands normally used to create various displays would include the precise names and order of the data to be displayed. But, according to the present invention, these values are replaced with calls to a "Meta Data Table," which includes the values to insert in these commands. As a result, by simply editing the Meta Data Table, it becomes possible to revise the display without changing the underlying code. Because the Meta Data Table is maintained in a centralized location, it is easy to control the version of this data and it instantly modifies the display for every client that accesses the Meta Data Table.

BRIEF DESCRIPTION OF THE DRAWINGS

FIG. 3 depicts an opening screen in the embodiment of FIG. 1, which enables a user to select a particular credit card application to open for processing according to the present invention.

FIG. 4 depicts a second screen in the embodiment of FIG. 1, after the user selects a particular credit application as in FIG. 3 according to the present invention.

FIGS. 5A–E depict a tree meta data table for use in determining the tree structure depicted in FIG. 4 according to the present invention.

FIGS. 6A–F depicts a meta data table for use in creating the grid display depicted in FIG. 4 according to the present invention.

DETAILED DESCRIPTION

To enable rapid modification of the program that controls a graphical user interface, the present invention uses generic statements in the commands in the underlying computer program that reference a series of tables (termed "Meta Data Tables"), in which are stored the values necessary to effect the desired command. For example, the English equivalent to a variable used in the program is defined in these tables, which then display the English equivalent to the user so that the user never needs to know the cryptic computer coded language. In addition, the translation from the cryptic code to English can be easily changed by editing the Meta Data Table to account for changing user desires. These tables are known as Meta Data Tables because they store Meta Data, which is defined herein as data or information about other data. An example of Meta Data is the number of fields designated for the name in a credit card processing system. Another example could be the order in which the fields are presented on the display. Even the color in which the data is displayed constitutes Meta Data.

An even more powerful example of the use of the Meta Data Table is to define the nodes within the tree of screens presented to the user in a Graphical User Interface (GUI). By defining the nodes in the tree in a Meta Data Table, these nodes can be changed easily, but even more significant, the underlying Visual Basic code can be significantly reduced in size. In one example, the Visual Basic program was reduced to about one-third its normal size. Making the code that executes on the client as small as possible obviously speeds up the execution, but also reduces potential errors in the code and reduces the maintenance of the code. As GUIs have become more and more complex, the present invention significantly reduces the complexity of GUIs while simultaneously reducing the design requirements and the time from the requirements phase to the final version.

Figure 1:
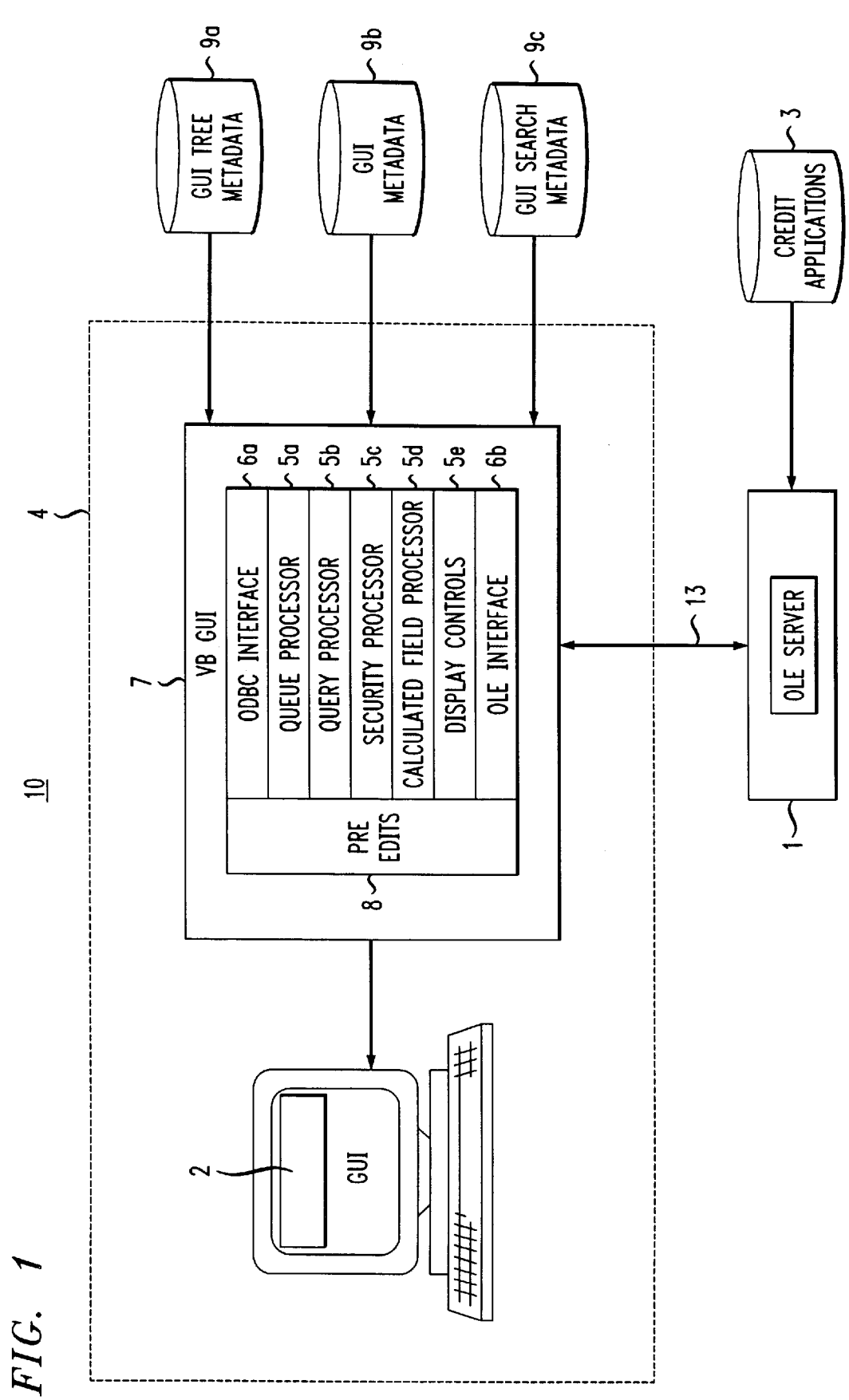
FIG. 1 depicts one possible implementation of the present invention in a system for processing credit card applications.

FIG. 1 depicts the overall block diagram of one embodiment in which the present invention is applied, which is a credit card application processing system 10. An OLE server 1 is coupled to a client 4, and several other clients (not shown, but which are identical to client 4) via a network 13. The OLE server 1 includes a database 3, which stores credit applications. The database operating system is "ACCESS"

by Microsoft, for example, which is managed by a Database Management System, such as Oracle.

The user accesses system 10 via the client workstation 2. The graphical user interface 7 for the work station 2 includes a series of processors—a queue processor 5a, a query processor 5b, a security processor 5c, a calculated field processor 5d, and a display controller 5e—and two interfaces, an ODBC interface 6a and an OLE interface 6b. In addition, the client includes pre edits 8. The workstation accesses several meta data tables 9—the GUI Tree Meta Data Table 9a, the GUI Meta Data Table 9b, and the GUI Search Meta Data Table 9c. The GUI is controlled by the Visual Basic program (the "presentation layer") interacting with the Meta Data Tables 9a–9c.

Figure 2:
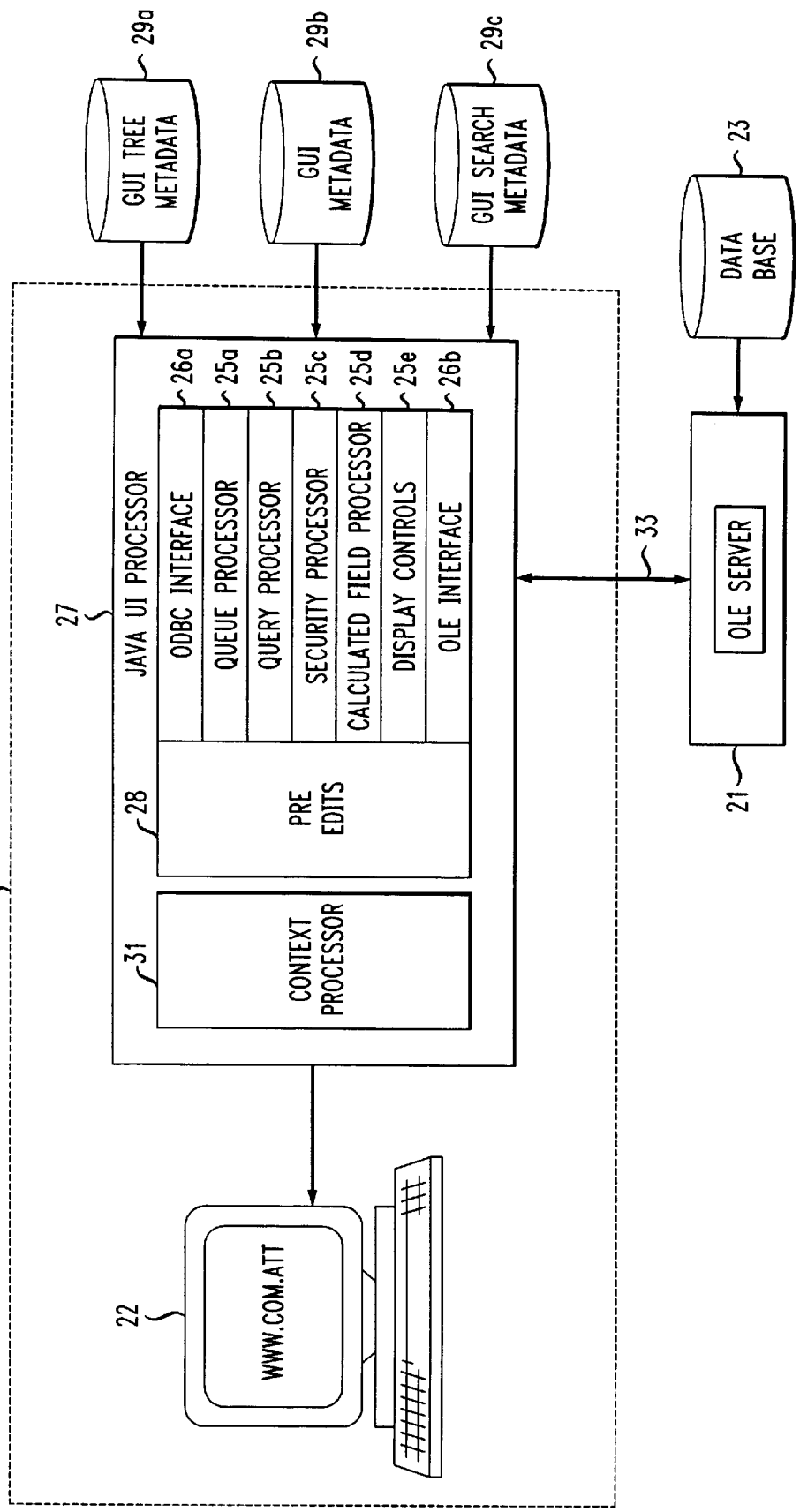
FIG. 2 depicts another implementation of the present invention in an Internet application.

FIG. 2 depicts the present invention being applied in an Internet or Intranet environment. An OLE server 21 is coupled to a client 24, and several other clients (not shown, but which are identical to client 24) via a standard Internet connection 33. The OLE server 21 includes a database 23, which stores data for the particular application. The database operating system could be "ACCESS" by Microsoft, for example, and the database could be managed by a Database Management System, such as Oracle.

The user accesses system 20 via the client workstation 22. The graphical user interface 27 for the work station 22 includes a series of processors—a queue processor 25a, a query processor 25b, a security processor 25c, a calculated field processor 25d, and a display controller 25e—and two interfaces, an ODBC interface 26a and an OLE interface 26b. In addition, the client includes pre edits 28 and a context processor 31. The workstation accesses several meta data tables 29—the GUI Tree Meta Data Table 29a, the GUI Meta Data Table 29b, and the GUI Search Meta Data Table 29c. The GUI 27 is controlled by the Visual Basic program (the "presentation layer") interacting with the Meta Data Tables 29a–29c.

Turning to FIG. 3, shown therein is a screen 30 that is part of a GUI presented to the user of the system depicted in FIG. 1. This screen 30 is one of the initial screens presented to the user that enables the user to open a particular credit card application. The column 32 labeled AppID includes the Application Identification number that is associated with each credit card application. Other columns include the name of the applicant 33, the type of the application 34 and the response date 35. Moving the cursor 37 and highlights the selected application; by then clicking on the "OK" button 36, the user proceeds to the next screen within the GUI for the selected application.

The next screen 40 presented to the user is depicted in FIG. 4. This screen 40 shows the selected branch 41 on the tree 42 whose contents is dropped on the grid 43 to the right of the tree 42. At the top of the screen 40 is the particular credit card application 44 selected in FIG. 3. Underneath the title 44 of the screen are three tabs—Decision 45a, Application 45b and Credit 45c. In the screen selected by the user, Application 45b has been selected.

The area labeled 46 includes the tree structure 42 within the application selection. Both the tree structure 42 and nodes in the tree are determined from a Tree Meta Data Table 50, which is depicted in FIGS. 5A–E. To the right of the tree 42 is the grid 43 shown the selection underneath "Addresses/Phone #s that has been highlighted by the user. This grid 43 includes two columns—one for the field 46 and another for the value 47 associated with the field.

The fields 46, 47 are also defined by a Meta Data Table 60, which is depicted in FIGS. 6A–F. The values 47 are read from a database that stores the credit card application data. As shown in FIGS. 6A–F, the column name includes the order in which the data are displayed to the user. In this column, the formal computer codes are used, which link the data to be displayed and the underlying executing program.

For example, shown in FIG. 5C in the column labeled "ND_DSC" 51 in the third row is the entry Solicited (SSOL) Application 52. Directly below this row are the nodes within the tree for Solicited (SSOL) Application, i.e., Applicant, Co-Applicant, Authorized Users, Addresses/Phone #s, etc. By editing these rows, one can modify the tree structure without requiring changes to the underlying code.

In FIG. 6D with the label "DSPLY_LBL_NM" 67e are the English names used to label these fields on the screen for the user, i.e., the translation from computer code to English. By editing the column "DSPLY_LBL_NM" 67e one can modify the labels displayed to the user. By editing the column "COLUMN_NAME" 62 one can modify the order and number of fields displayed to the user. For example, by switching the first row 63 with the 13th row labeled "Home Addr Unparsed Line 1" 64 one can present the complete address first rather than the parsed address.

Turning now to the Meta Tables, FIGS. 5A–E depict the Tree Meta Data Table 50. Each figure in FIGS. 5A–E represent successive columns in a matrix, but have been separated to fit on a page. The first column labeled "APP_TYP-CD" (Application Type Code) 57a indicates the type of application. This is a field specific to the given application, i.e., a solicited application, or a credit application or a blank application for data entry.

The second column labeled "ND_ID" 57b is the node identification, which is followed by the Frame Identification ("FRM_ID") 57c. Next, is the Tree Type Code 57d; each tree is assigned a unique code. For example, the third row 72 beginning with SSOL is the SSOL tree. There is also a Credit Person Tree (see row 73) and a Credit Detection Tree (see row 74), and an Application Entry Tree (row 75).

Next, are five columns 58a–58d that are navigational aid for the tree. These are shown in FIG. 5B. That is, these columns tell how to navigate within the data model of the current system.

FIG. 5C includes three columns 59a, 51 and 59b. The first column 59a is the check calculation number ("CHK_CALC_NM"), which controls the icon that appears to the left of the leaf in the node, such as the ✓ or the X. The next column 51 is the node description, which is the English text that appears in the leaf. The last column 59b is the formal description of the node.

FIG. 5D includes five columns 70a–70e. The first 70a indicates the parent node identification. The second column 70b determines whether the node is expandable or not. The third 70c is the count calculation number. The fourth 70d is the display format code, which determines whether the node is displayed as a file or as a paper. The last column 70e is the node type code. The code "X" indicates it is not displayable; "F" is a heading type; "M" is multiple rows; and "C" is a vertical grid.

FIG. 5E includes three columns 71a–71c. The first column 71a indicates the splitter position number, which determines how to scroll the columns in the grid. For example, a zero indicates that all columns to the left of the zero column scroll. A one indicates that the first column always remains in the first column and the remaining columns scroll. The next column 71b indicates whether the item is draggable. The last column 71c indicates whether the item is manually selectable or not.

FIGS. 6A–F depict the GUI Meta Data Table 60. As with FIGS. 5A–E, these FIGs should be placed side by side, as they represent a single matrix, which has been split into different pages to enable it to fit.

FIG. 6A includes five columns 64a–64e. The first column 64a is the application type code. The second column 64b is the node identification. The third column 64c is the display (merely a number). The fourth column 64d is the parent entity name, and the fifth column 64e is the parent determinant field name. These are navigational aids for navigating through the data model.

FIG. 6B includes three columns 65a–65c. The first column 65a is the parent condition code. The second column 65b is the parent instance value description. The third column 65c is the entity name.

FIG. 6C includes four columns 66a–66d. The first column 66a is the column name, i.e., the formal name used within the presentation layer program. Next, is the determinant field name 66d, the condition code 66c and the instance value description 66d, which are aids for navigating through the data model.

FIG. 6D includes five columns 67a–67e, the first 67a of which is the instance number. The second column 67b indicates whether this item is updatable. The third 67c indicates whether this item is a critical field. If so, then certain steps are required. The fourth column 67d is the display edit code, which determines the format of the data. The last column 67e is the display label name, i.e., the English text displayed on the screen.

FIG. 6E includes four columns 68a–68d. The first column 68a is the display help text that appears on the bottom scroll bar if the cursor rests on the particular item. This enables easy entry of messages to the users or quick notes to correct common misunderstandings. The next column 68b determines the column size. The third column 68c determines whether this is an enumerated field, i.e., there are only certain possible states for this field. The last 68d is the security calculation name, which indicates whether this field can be updated by the user, or requires further authorization.

FIG. 6F includes two columns 69a–69b, the first 69a of which is the display control type code. The second column 69b is the parent instance number.

The present invention enables rapid changes to the displays in a GUI. Furthermore, the present invention makes it possible to begin coding of the GUI without knowing the exact displays because the Meta Data Table can be modified later. Often, a large software project is delayed due to the delays in determining the user requirements, especially where there are many users. According to the present invention, a prototype can be created and then the software coding can begin. If the prototype requires changes, the Meta Data Table can be modified to account for the required changes.

Furthermore, the present invention is applicable to Internet applications, in which it is desirable to modify the Web site quickly and without requiring a technician (or engineer).

What is claimed is:

1. A method for enabling rapid modification of a graphical user interface whose display screens are controlled by a computer program, comprising the steps of:
   a) storing meta data in a table that reduces the size of the computer program generating the graphical user interface, which meta data includes a first data set regarding a second data set to be displayed via the graphical user interface
   b) executing an instruction in the computer program that refers to the meta data table when preparing the second data set for display via the graphical user interface;
   c) controlling the display screens based on the interaction between the instructions in the computer program and the meta data tables.

2. The method according to claim 1, wherein said first data set includes at least one selected from the group consisting of a data label, an ordering of data, and a data mask.

3. The method according to claim 1, wherein said first data set includes a tree structure.

4. The method according to claim 1, further comprising the step of displaying the meta data table in response to a user command.

5. The method according to claim 4, further comprising the step of permitting user editing of the meta data table independent of the computer program.

6. The method according to claim 5, further comprising the step of saving a revised meta data table so that further executions of the computer program refer to the revised meta data table.

7. The apparatus according to claim 1, wherein the first data set includes at least a command tree structure and nodes associated with the command tree structure.

8. A method for organizing a computer program so that future modifications to a graphical user interface created by the computer program can be implemented rapidly and by any user without requiring detailed knowledge of the computer program, said method comprising the steps of:
   a) separating meta data from programming instructions, which form an executable instruction list;
   b) storing the meta data in a user accessible file that reduces the size of the computer program generating the graphical user interface, whereby a user can edit the meta data;
   c) referring to the user accessible file containing the meta data in the executable instruction list when creating any graphical user interface; and
   d) establishing parameters of any data to be displayed via the graphical user interface in accordance with the meta data stored in the user accessible file.

9. The method according to claim 8, wherein the meta data includes a first set of data regarding a second set of data, and the second set of data is that data which is to be displayed via the graphical user interface.

10. The method according to claim 8, wherein the user accessible file includes a database.

11. The method according to claim 8, wherein the parameters include at least one selected from the group consisting of data labels, an order of the data presented, a color, a data type, a mask for the data, and a number of positions for the data.

12. The method according to claim 8, wherein the parameters include a command tree structure and nodes associated with the command tree structure.

13. An information processing apparatus in a client-server environment, comprising:
   a) a presentation layer program running on a client workstation and controlling a navigation through a plurality of screens to enable a user to select specific records for processing;
   b) a database accessible by the client and the server;
   c) a meta data table stored in the database, that reduces the size of the computer program generating the graphical user interface, and interacting with the presentation layer program to create displays on the plurality of screens, wherein the meta data table stores information regarding the data to be displayed on the plurality of screens; and d) a database manager controlling an operation of the database to enable interaction of the user with the meta data table, wherein the database manager permits user editing of the meta data table independent of the presentation layer program.

14. The apparatus according to claim 13, wherein said information regarding the data to be displayed includes at least one selected from the group consisting of a data label, an ordering of data, and a data mask.

15. The apparatus according to claim 13, wherein the database manager displays the meta data table in response to a user command.

16. The apparatus according to claim 13, wherein the database manager permits user editing of the meta data table independent of the presentation layer program.

17. The apparatus according to claim 13, wherein the database manager saves a revised meta data table so that further executions of the presentation layer program refer to the revised meta data table.

18. The apparatus according to claim 13, wherein the information regarding the data to be displayed includes at least one whether a particular icon is draggable or not.

19. The apparatus according to claim 13, wherein the information regarding the data to be displayed includes at least which type of icon is associated with a particular node.

20. The apparatus according to claim 13, wherein the information regarding the data to be displayed includes at least a column width.

21. The apparatus according to claim 13, wherein the information regarding the data to be displayed includes at least scrolling parameters.

22. The apparatus according to claim 13, wherein the information regarding the data to be displayed includes at least help instructions that appear when a cursor rests on the field.

23. The apparatus according to claim 13, wherein the information regarding the data to be displayed includes at least searching of the data.

24. The apparatus according to claim 13, wherein the information regarding the data to be displayed includes at least navigational aids for navigating through a model of the data.

25. The apparatus according to claim 13, wherein the information regarding the data to be displayed includes a command tree structure and nodes associated with the command tree structure.

26. The apparatus according to claim 13, wherein the information regarding the data to be displayed includes whether a field is updatable.

27. The apparatus according to claim 13, wherein the information regarding the data to be displayed includes whether a field is a critical field.

28. The apparatus according to claim 13, wherein the information regarding the data to be displayed includes a display code for a field.

29. The apparatus according to claim 13, wherein the information regarding the data to be displayed includes whether a field is an enumerated field that may have only a predetermined number of possible values.

30. The apparatus according to claim 13, wherein the information regarding the data to be displayed includes a security code indicating that a certain level of security is required to modify a field associated with the security code.

* * * * *